US012287610B2

(12) United States Patent
Sakamoto et al.

(10) Patent No.: US 12,287,610 B2
(45) Date of Patent: Apr. 29, 2025

(54) WATCH COMPONENT, AND WATCH

(71) Applicant: Seiko Epson Corporation, Tokyo (JP)

(72) Inventors: Takeshi Sakamoto, Chino (JP); Kazunori Hoshino, Matsumoto (JP); Takahiro Seki, Shiojiri (JP); Ken Wakita, Minowa (JP)

(73) Assignee: SEIKO EPSON CORPORATION (JP)

( * ) Notice: Subject to any disclaimer, the term of this patent is extended or adjusted under 35 U.S.C. 154(b) by 702 days.

(21) Appl. No.: 17/504,846

(22) Filed: Oct. 19, 2021

(65) Prior Publication Data

US 2022/0121154 A1 Apr. 21, 2022

(30) Foreign Application Priority Data

Oct. 20, 2020 (JP) ................................ 2020-175883

(51) Int. Cl.
*G04B 19/04* (2006.01)

(52) U.S. Cl.
CPC .................................. *G04B 19/042* (2013.01)

(58) Field of Classification Search
CPC .................................................... G04B 19/042
USPC .......................................................... 428/469
See application file for complete search history.

(56) References Cited

U.S. PATENT DOCUMENTS

2018/0334736 A1 11/2018 Yamazaki et al.

FOREIGN PATENT DOCUMENTS

| | | | |
|---|---|---|---|
| JP | 2006267088 | A | * 10/2006 |
| JP | 2007-178234 | A | 7/2007 |
| JP | 2010-077457 | A | 4/2010 |
| JP | 2010-078336 | A | 4/2010 |
| WO | 2016-104329 | A1 | 6/2016 |

OTHER PUBLICATIONS

Kawakami et al., JP 2006267088A Google Patents Machine Translation printed on Jun. 12, 2024, Oct. 5, 2006, entire translation (Year: 2006).*

* cited by examiner

*Primary Examiner* — Katherine A Christy
(74) *Attorney, Agent, or Firm* — Harness, Dickey & Pierce, P.L.C.

(57) ABSTRACT

A watch component having an oxide film formed by oxidizing a base material containing iron as a main component, an average film thickness of the oxide film is from 70 nm to 145 nm, and a variation in film thickness of the oxide film is equal to or less than 35%.

4 Claims, 5 Drawing Sheets

| | HEATING TEMPERATURE (°C) | HEATING TIME (MINUTES) | AVERAGE FILM THICKNESS (nm) | VARIATION IN FILM THICKNESS (%) | APPEARANCE EVALUATION | PRODUCTIVITY EVALUATION | REASON |
|---|---|---|---|---|---|---|---|
| LEVEL 1 | 300 | 2.0 | 55.7 | 34 | POOR | GOOD | BLUEISH RESIDUE |
| LEVEL 2 | | 2.5 | 69.7 | 31 | GOOD | GOOD | |
| LEVEL 3 | | 3.0 | 92.2 | 29 | GOOD | GOOD | |
| LEVEL 4 | | 3.5 | 119.2 | 26 | GOOD | GOOD | |
| LEVEL 5 | | 4.0 | 140.1 | 21 | GOOD | GOOD | |
| LEVEL 6 | | 5.0 | 144.8 | 19 | GOOD | POOR | DECREASE IN TAT |
| LEVEL 7 | 200 | 3.0 | 75.3 | 30 | GOOD | GOOD | |
| LEVEL 8 | | 3.5 | 86.7 | 29 | GOOD | GOOD | |
| LEVEL 9 | | 4.0 | 101.2 | 27 | GOOD | GOOD | |
| LEVEL 10 | 400 | 3.0 | 119.5 | 36 | GOOD | GOOD | |
| LEVEL 11 | | 3.5 | 145.1 | 33 | GOOD | GOOD | |
| LEVEL 12 | | 4.0 | 170.3 | 29 | GOOD | POOR | TOO RAPID CHANGE/ LARGE VARIATION |

FIG. 4

WATCH COMPONENT, AND WATCH

The present application is based on, and claims priority from JP Application Serial Number 2020-175883, filed Oct. 20, 2020, the disclosure of which is hereby incorporated by reference herein in its entirety.

BACKGROUND

1. Technical Field

The present disclosure relates to a watch component including a watch hand or the like, and to a watch.

2. Related Art

A watch component is required to have various tones because of decorative properties thereof. For example, JP 2010-78336 A discloses a technology to develop a blue color by heating a watch hand made of stainless steel or the like to form an oxidized film.

However, the oxidized film is excellent in long term tone retention, but it is difficult to develop multiple colors. On the other hand, a variety of color tones can be created by a paint film formed by a painting process, but there are problems such as occurrence of unevenness due to a liquid pool, a shear droop of a corner portion of a watch component, and discoloration due to aging deterioration. Therefore, there has been a demand for a watch component having both durability and decorative properties.

SUMMARY

A watch component has an oxide film formed by oxidizing a base material containing iron as a main component, wherein an average film thickness of the oxide film is from 70 nm to 145 nm, and a variation in film thickness of the oxide film is equal to or less than 35%.

A watch includes the watch component described above.

BRIEF DESCRIPTION OF THE DRAWINGS

FIG. 4 is a table showing evaluation results of film thicknesses and variations in an oxide film.

DESCRIPTION OF EXEMPLARY EMBODIMENTS

First, a configuration of a watch 100 will be described with reference to FIGS. 1 and 2.

Figure 1:
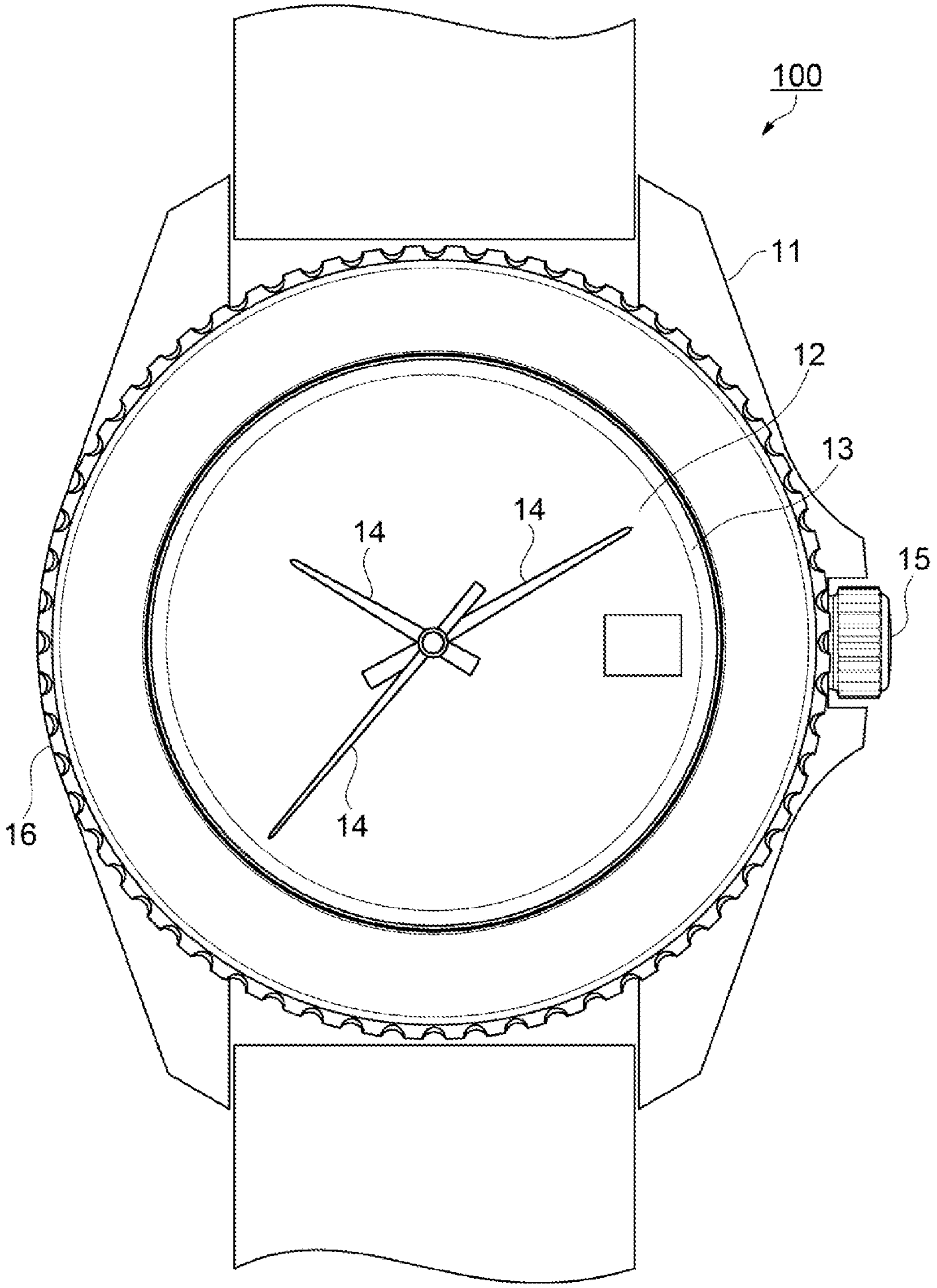
FIG. 1 is a plan view illustrating a configuration of a watch.

As illustrated in FIG. 1, the watch 100 includes a flat cylindrical case body 11. A dial 12 is installed inside the case body 11, and a cover glass 13 is installed to cover the dial 12. Watch hands 14 including a seconds hand, a minute hand, an hour hand, and the like are installed at the dial 12, and a time display is visible from a front surface side of the watch 100 through the cover glass 13.

Figure 2:
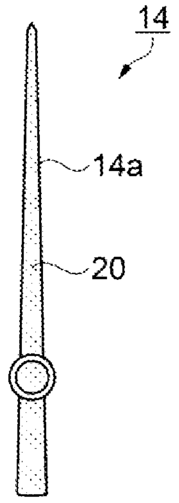
FIG. 2 is a plan view illustrating a configuration of a watch hand.

As illustrated in FIG. 2, the watch hand 14 includes a base material 14*a* formed of a material containing iron as a main component, for example. A watch component visible to a user, such as the watch hand 14, has an oxide film 20 formed at a surface of the base material 14*a*. Furthermore, since the oxide film 20 varies in film thickness within a predetermined numerical range, and various colors are combined while a gray color is a main color, unique decorative properties can be created. Note that, the material containing iron as a main component contains iron, or iron and carbon.

A crown 15 is disposed at a side surface of the case body 11 for adjusting and setting the watch hand 14, and the like. Note that, buttons may be installed adjacent to the crown 15. In addition, the watch 100 is provided with, for example, a rotating bezel 16 at which recesses and protrusions are formed at an outer periphery and a letter or the like is displayed.

Next, a method of manufacturing a watch component including the watch hand 14 or the like will be described with reference to FIG. 3.

Figure 3:
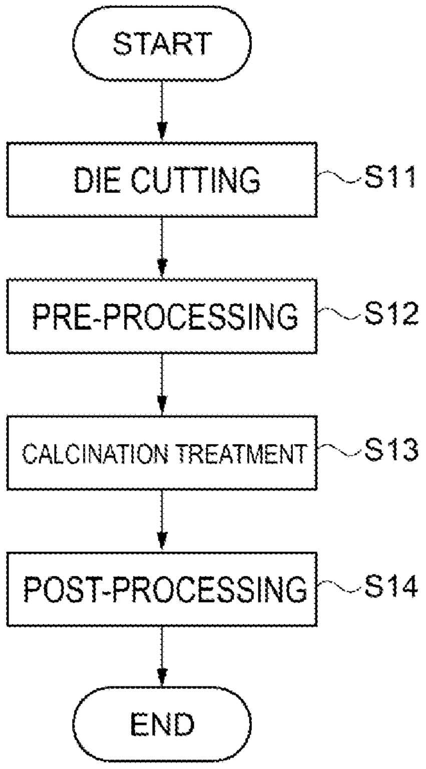
FIG. 3 is a flowchart illustrating a method of manufacturing the watch hand.

As illustrated in FIG. 3, die cutting is performed in step S11. Specifically, a desired shape of the watch component is pulled out from a base material by press working. Note that, the present disclosure is not limited to forming a component by die cutting as the watch component, and for example, a watch component may be formed by cutting.

In step S12, pre-processing is performed. Specifically, the watch component is cleaned or the watch component is polished.

In step S13, a calcination treatment is performed. Specifically, the watch component is heated at a predetermined temperature to form the oxide film 20 at a surface of the watch hand 14, for example. Note that, examples of the method of the calcination treatment include burners, ovens, lasers, hot plates, and anodization.

In step S14, post-processing is performed. Specifically, the watch component is cleaned or the watch component is polished. Also, a protective film 14*b* (see FIGS. 5A to 6B) may be formed at a surface of the watch component. In this way, the watch component is completed.

Next, evaluation results of film thicknesses and variations of the oxide film 20 formed at the watch hand 14 as the watch component in the above calcination treatment will be described with reference to FIG. 4.

In a table shown in FIG. 4, a heating temperature and a heating time were varied while the oxide film 20 was formed, and appearance evaluation and productivity evaluation of the oxide film 20 formed under the combined conditions were performed. The heating temperature is, for example, a set temperature of a heating device. Note that, a measured temperature of the heated watch hand 14 may be used. The evaluation of the oxide films 20 was performed from a level 1 to a level 12, which are combinations of the heating temperature and the heating time. Average film thicknesses and variations in film thickness of the oxide films 20 at that time are summarized in the table in FIG. 4.

The heating temperature was changed at three stages: 300° C., 200° C., and 400° C. A set time of the heating time was selectively changed in a range from 2 minutes to 5 minutes in accordance with the heating temperature.

GOOD for the appearance evaluation is a passing level from the perspective of decorative properties, and POOR is a rejected level from the perspective of decorative properties. The decorative properties at the passing level of the present exemplary embodiment mean unique decorative properties in which various colors are combined while a gray color is a main color. In order to produce such decorative properties, the oxide film 20 is varied in film thickness within a predetermined range. Furthermore, GOOD for the productivity evaluation is a level excellent in mass productivity due to heating time or the like, and POOR is a level not suitable in terms of mass productivity.

First, the results of the appearance evaluation will be described. The level 2 to the level 12 are the passing levels (GOOD) from the perspective of decorative properties. The level 1 is the rejected level (POOR) from the perspective of decorative properties (specifically, a bluish residue).

Next, the results of the productivity evaluation will be described. The level 1 to the level 5, and the level 7 to the level 11 are levels excellent in mass productivity (GOOD). The level 6 is a level that is not suitable in terms of mass productivity due to a decrease in a TAT (turnaround time) (POOR). In addition, the level 12 is a level that is not suitable in terms of mass productivity from the perspective of difficulty in control due to rapid changes in film thickness, a decrease in the TAT, and the like.

From the above results, an optimum average film thickness, and an optimal range of a variation in film thickness of the oxide film 20 are defined. In other words, a range determined to be GOOD for both the appearance evaluation and the productivity evaluation is defined. Note that, the average film thickness of the oxide film 20 is a numerical value obtained by measuring film thicknesses of one cross-section of the watch hand 14 at a plurality of places, and determining an average value thereof. Additionally, the variation in film thickness of the oxide film 20 is a numerical value calculated by 6 (a standard deviation)/an average value.

The optimum average film thickness of the oxide film 20 falls within a range from 70 nm to 145 nm. Moreover, the optimal variation in film thickness of the oxide film 20 is equal to or less than 35%. By defining the oxide film 20 in such a numerical range, the oxide film 20 appropriately varies in film thickness within the numerical range described above, and various colors are combined while the gray color is the main color, so unique decorative properties can be provided. In addition, because the oxide film 20 is formed, a watch component including the watch hand 14 with durability can be provided.

Note that, the variation in film thickness of the oxide film 20 may be greater than or equal to than 20%. In other words, the variation in film thickness of the oxide film 20 may be from 20% to 35%. By setting the variation in film thickness to greater than or equal to 20%, the variation can be prevented from being too small to make colors simple, as is the case when the variation in film thickness is less than or equal to 20%.

Next, a state of the oxide film 20 formed at the watch hand 14 will be described with reference to FIGS. 5A, 5B, 6A, and 6B.

Figure 5A:
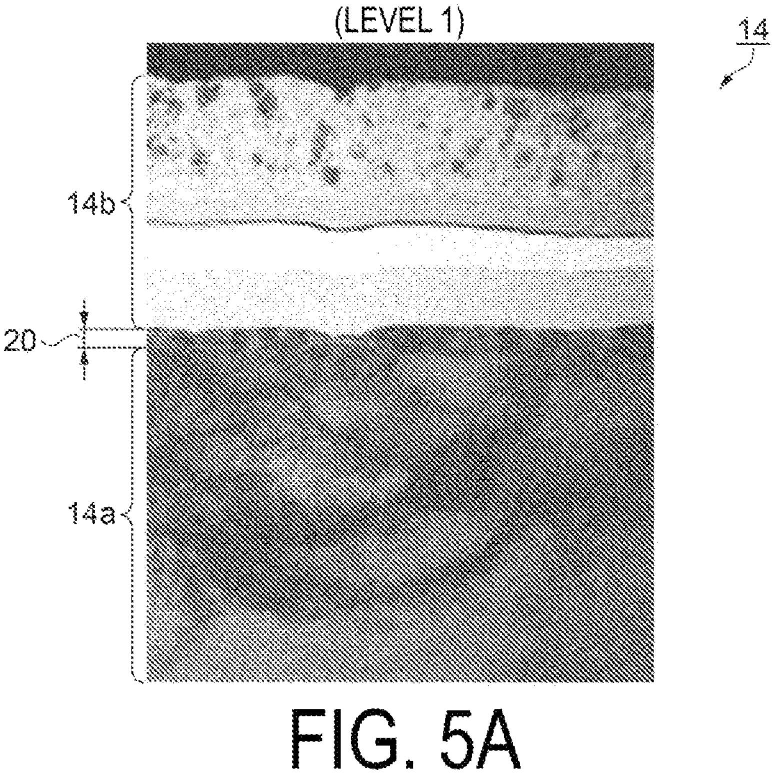
FIG. 5A is a diagram illustrating a cross-sectional state of a watch hand at a level 1.
Figure 5B:
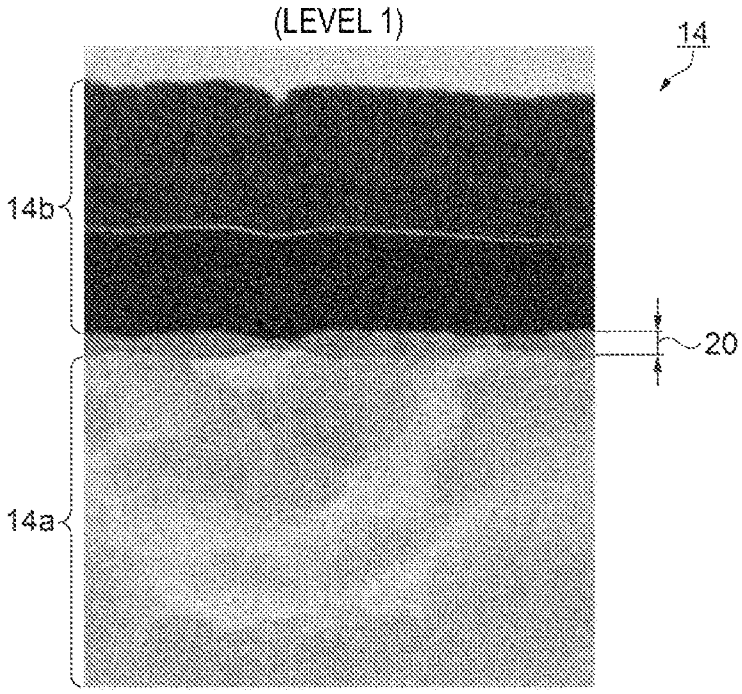
FIG. 5B is a diagram illustrating a cross-sectional state of the watch hand at the level 1.
Figure 6A:
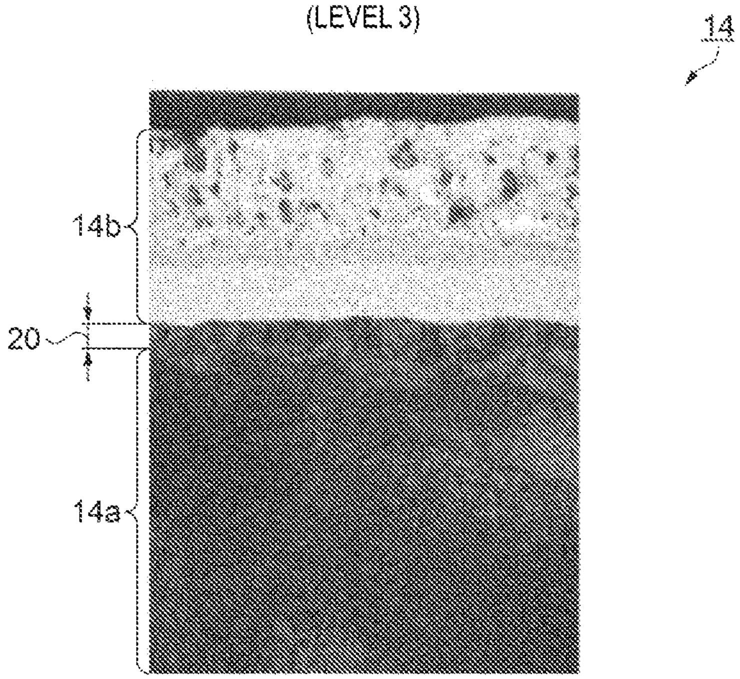
FIG. 6A is a diagram illustrating a cross-sectional state of a watch hand at a level 3.
Figure 6B:
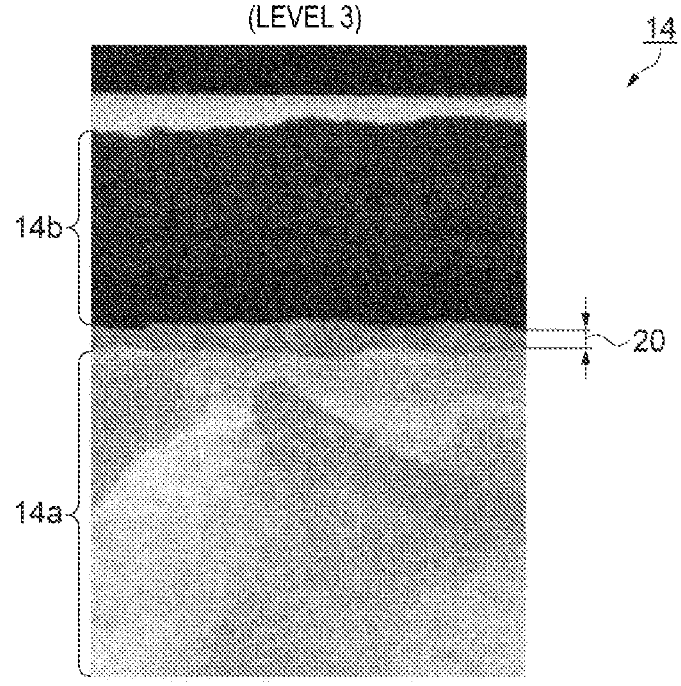
FIG. 6B is a diagram illustrating a cross-sectional state of the watch hand at the level 3.

Each of FIGS. 5A to 6B is a diagram illustrating a cross section of the watch hand 14 cut with an ion beam, and enlarged by an STEM (electron microscope). Each of FIGS. 5A and 5B is a diagram illustrating a state of a cross section of the watch hand 14 at the level 1. Each of FIGS. 6A and 6B is a diagram illustrating a state of a cross section of the watch hand 14 at the level 3. Note that, each of FIGS. 5A and 6A is a transmission electron image of the cross section of the watch hand 14. Each of FIGS. 5B and 6B is a scatter electron image of the cross section of the watch hand 14.

The watch hand 14 illustrated in each of FIGS. 5A to 6B includes the base material 14*a*, the oxide film 20 formed at the base material 14*a*, and the protective film 14*b* formed at the oxide film 20.

As illustrated in FIGS. 5A and 5B, in the watch hand 14 at the level 1 determined to be rejected, a variation in film thickness of the oxide film 20 is large. On the other hand, as illustrated in FIGS. 6A and 6B, in the watch hand 14 at the level 3 determined to be passing, a variation in film thickness of the oxide film 20 is small. Thus, based on the state in the figure, it is possible to determine small and large of the variation in film thickness between the watch hand 14 at the level 1, and the watch hand 14 at the level 3.

As described above, the watch hand 14 as the watch component of the present exemplary embodiment has the oxide film 20 formed by oxidizing the base material 14*a* with iron as a main component, the average film thickness of the oxide film 20 is from 70 nm to 145 nm, and the variation in film thickness of the oxide film 20 is equal to or less than 35%.

According to this configuration, the oxide film 20 varies in film thickness within the numerical range described above, various colors are combined while the gray color is the main color, thus unique decorative properties are provided, and in addition, the oxide film 20 is formed, thus a watch component with durability can be provided.

Furthermore, the base material 14*a* may contain iron, or iron and carbon. According to this configuration, it is possible to develop colors of the base material 14*a* by oxidation, and it is possible to prevent aging deterioration, and occurrence of an impression of a shear droop of a shape of a watch component, compared to a paint film.

Further, the variation in film thickness of the oxide film 20 may be greater than or equal to 20%. According to this configuration, since the variation in film thickness is greater than or equal to 20%, the variation can be prevented from being too small to make colors simple, as is the case when the variation is less than or equal to 20%.

Further, the watch 100 of the present exemplary embodiment includes the watch component described above. According to this configuration, the watch 100 having both decorative properties and durability can be provided.

Hereinafter, a modification example of the exemplary embodiment described above will be described.

Note that, a watch component is not limited to the watch hand 14 as in the exemplary embodiment described above, and may be a watch component that is visible to the user, and can be applied to, for example, a screw, a shaft of the watch hand 14, an indicator (hour marker), a window frame of a calendar, a logo, all components attached to a dial, and the like.

In this way, the watch component may be the watch hand 14, the shaft of the watch hand 14, the screw, or other components. According to this configuration, it is possible to improve decorative properties and durability of a portion of the watch 100 visible as appearance.

What is claimed is:

1. A watch component, comprising:

a body formed of a material containing iron as a main component, and that defines one of a watch hand, a shaft of a watch hand, and a screw;

an oxide film formed by oxidizing the iron of the body, the oxide film being provided on a visible side of the body and having a gray color as a main color of the oxide film, wherein an average film thickness of the oxide film is from 70 nm to 145 nm, and a variation in film thickness of the oxide film is greater than or equal to 20% and equal to or less than 35%.

2. The watch component according to claim 1, wherein the base material contains iron, or iron and carbon.

3. A watch, comprising:

the watch component according to claim 1.

4. A watch, comprising:

the watch component according to claim 2.

* * * * *